United States Patent
Merriman et al.

(10) Patent No.: US 9,545,778 B2
(45) Date of Patent: Jan. 17, 2017

(54) SYSTEM AND METHOD FOR APPLYING PRESSURE TO STRUCTURAL COMPONENTS

(71) Applicant: The Boeing Company, Huntington Beach, CA (US)

(72) Inventors: Ryan Joseph Merriman, St. Charles, MO (US); James R. Fox, University City, MO (US); Charles Richard Prebil, University City, MO (US); Steven J. Burpo, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 222 days.

(21) Appl. No.: 14/451,065

(22) Filed: Aug. 4, 2014

(65) Prior Publication Data

US 2016/0031199 A1    Feb. 4, 2016

(51) Int. Cl.
*B32B 37/00*    (2006.01)
*B32B 37/10*    (2006.01)
(Continued)

(52) U.S. Cl.
CPC ......... *B32B 37/0046* (2013.01); *B29C 66/112* (2013.01); *B29C 66/131* (2013.01); *B29C 66/524* (2013.01); *B29C 66/532* (2013.01); *B29C 66/721* (2013.01); *B29C 66/8161* (2013.01); *B29C 66/8322* (2013.01); *B29C 66/8432* (2013.01); *B29C 70/44* (2013.01);
(Continued)

(58) Field of Classification Search
CPC ............. B32B 37/0046; B32B 2605/18; B29D 99/0014; B64F 5/0009; B64C 1/12; B29L 2031/3082
See application file for complete search history.

(56) References Cited

U.S. PATENT DOCUMENTS 2,371,847 A    3/1945   Saunders et al.
6,964,723 B2   11/2005  Lindsay et al.
(Continued)

FOREIGN PATENT DOCUMENTS

JP    H06316005 A    11/1994

OTHER PUBLICATIONS

Extended European Search Repiort, dated Dec. 4, 2015, foe co-pending EP patent application No. EP 15172918.3 (7 pgs).

*Primary Examiner* — Carson Gross
(74) *Attorney, Agent, or Firm* — Armstrong Teasdale LLP

(57) ABSTRACT

A mechanical pressure application system for applying a tailored pressure distribution to a plurality of structural components is provided. Each structural component has a first surface, and each first surface is configured to interface with the first surface of another of the structural components at a contact area. A base and at least one tooling block are configured to removably couple to the structural components. Each at least one tooling block includes a first surface configured to be positioned proximate at least one of the plurality of structural components. A second surface of each tooling block is configured to receive at least one forcing member. At least one biasing mechanism is configured to apply a predetermined load to the at least one forcing member, such that a force is transmitted from the at least one forcing member through the tooling block to a corresponding portion of the contact area.

14 Claims, 10 Drawing Sheets

(51) Int. Cl.
  *B32B 37/14*   (2006.01)
  *B29C 70/44*   (2006.01)
  *B29C 65/00*   (2006.01)
  *B29D 99/00*   (2010.01)
  *B64F 5/00*   (2006.01)
  *B29L 31/30*   (2006.01)
  *F16B 11/00*   (2006.01)
  *B29C 65/48*   (2006.01)
  *B29C 65/50*   (2006.01)
  *B29C 65/02*   (2006.01)

(52) U.S. Cl.
  CPC ........... *B29D 99/0014* (2013.01); *B32B 37/10* (2013.01); *B32B 37/14* (2013.01); *B29C 65/02* (2013.01); *B29C 65/48* (2013.01); *B29C 65/4815* (2013.01); *B29C 65/5057* (2013.01); *B29C 66/73752* (2013.01); *B29C 66/742* (2013.01); *B29L 2031/3082* (2013.01); *B32B 2309/12* (2013.01); *B32B 2605/18* (2013.01); *B64F 5/0009* (2013.01); *F16B 11/006* (2013.01)

(56) References Cited

U.S. PATENT DOCUMENTS

| | | | |
|---|---|---|---|
| 2009/0217529 A1* | 9/2009 | Cerezo | B29C 70/34 29/897.2 |
| 2009/0320292 A1* | 12/2009 | Brennan | B29C 70/446 29/897.2 |
| 2012/0061006 A1* | 3/2012 | Marquardt | B29C 65/18 156/94 |
| 2012/0279662 A1* | 11/2012 | Barlag | B29C 70/541 156/443 |
| 2013/0309096 A1 | 11/2013 | Le Bras et al. | |
| 2014/0008010 A1 | 1/2014 | Kitabata et al. | |

\* cited by examiner

SYSTEM AND METHOD FOR APPLYING PRESSURE TO STRUCTURAL COMPONENTS

BACKGROUND

The field of the disclosure relates generally to applying pressure to structural components, and, more particularly, to systems and methods for applying a tailored pressure distribution to structural components.

At least some known structural applications involve an application of pressure to at least one interface between a plurality of structural components. For example, at least some known structures are formed by bonding together a plurality of structural components, and the bonding area between the components is subjected to an elevated pressure for a period of time. The structural components may include one or more of a composite structural component and a metallic structural component. An elevated temperature also may be applied during at least part of such a process to facilitate curing a bonding layer.

At least some known bonded structures are formed using a pressurized autoclave. For example, an air-tight vacuum bag is placed around at least part of the structure surrounding the bonding area, and the pressurized autoclave supplies both the elevated pressure and the elevated temperature for the bonding process. However, the bagging process required for such known techniques is labor-intensive and susceptible to failure, especially for relatively geometrically complex structural components. For example, structural components that include curved surfaces, angled pieces, and/or complex contours present a higher probability in tearing the bag, which results in one or more of re-bagging, a failed final assembly, repair or replacement of one or more involved structural components, and a need to repeat other labor- and material-intensive steps in a structural assembly process. Alternatively, at least some known bonded structures are formed using a press, but the use of a press is not practical for at least some known structures, such as relatively large or geometrically complex structures. Moreover, both a bag and a press are capable of applying only a constant pressure distribution.

BRIEF DESCRIPTION

In one aspect, a mechanical pressure application system for applying a tailored pressure distribution to a plurality of structural components is provided. Each of the plurality of structural components has a first surface and a second surface disposed generally opposite the first surface, and each first surface is configured to interface with the first surface of another of the plurality of structural components at a contact area. The system includes a base that is complementary to the second surface of at least one of the plurality of structural components. The system also includes at least one tooling block. The base and the at least one tooling block are configured to removably couple to the plurality of structural components. Each at least one tooling block includes a first surface and a generally opposite second surface. Each tooling block first surface is configured to be positioned proximate the second surface of at least one of the plurality of structural components when the base and the at least one tooling block are coupled to the plurality of structural components. The system also includes at least one forcing member. Each tooling block second surface is configured to receive at least one forcing member. The system further includes at least one biasing mechanism configured to apply a predetermined load to the at least one forcing member, such that a force is transmitted from the at least one forcing member through the tooling block to a corresponding portion of the contact area.

In another aspect, a method of applying a tailored pressure distribution to a plurality of structural components is provided. Each of the plurality of structural components has a first surface and a second surface disposed generally opposite the first surface. Each first surface is configured to interface with the first surface of another of the plurality of structural components at a contact area. The method includes removably coupling a base and at least one tooling block to the plurality of structural components such that a first surface of each at least one tooling block is positioned proximate the second surface of at least one of the plurality of structural components. The base is complementary to the second surface of at least one of the plurality of structural components. Each at least one tooling block includes a second surface generally opposite the first surface. The method also includes receiving at least one forcing member on the second surface of each at least one tooling block, and applying a predetermined load to the at least one forcing member such that a force is transmitted from the at least one forcing member through the at least one tooling block to a corresponding portion of the contact area.

DETAILED DESCRIPTION

Embodiments of the system and method described herein provide for an application of pressure to a contact area between a plurality of structural components. The embodiments provide a mechanical application of sustained pressure to the contact area over a desired period of time, without need for air-tight bagging or electrical power. The pressure applied to separate portions of the contact area may be separately adjustable. Certain embodiments include tooling components that may be deployed within an elevated temperature environment for simultaneous application of pressure and heat during a process, such as a curing or consolidation process.

Figure 1:
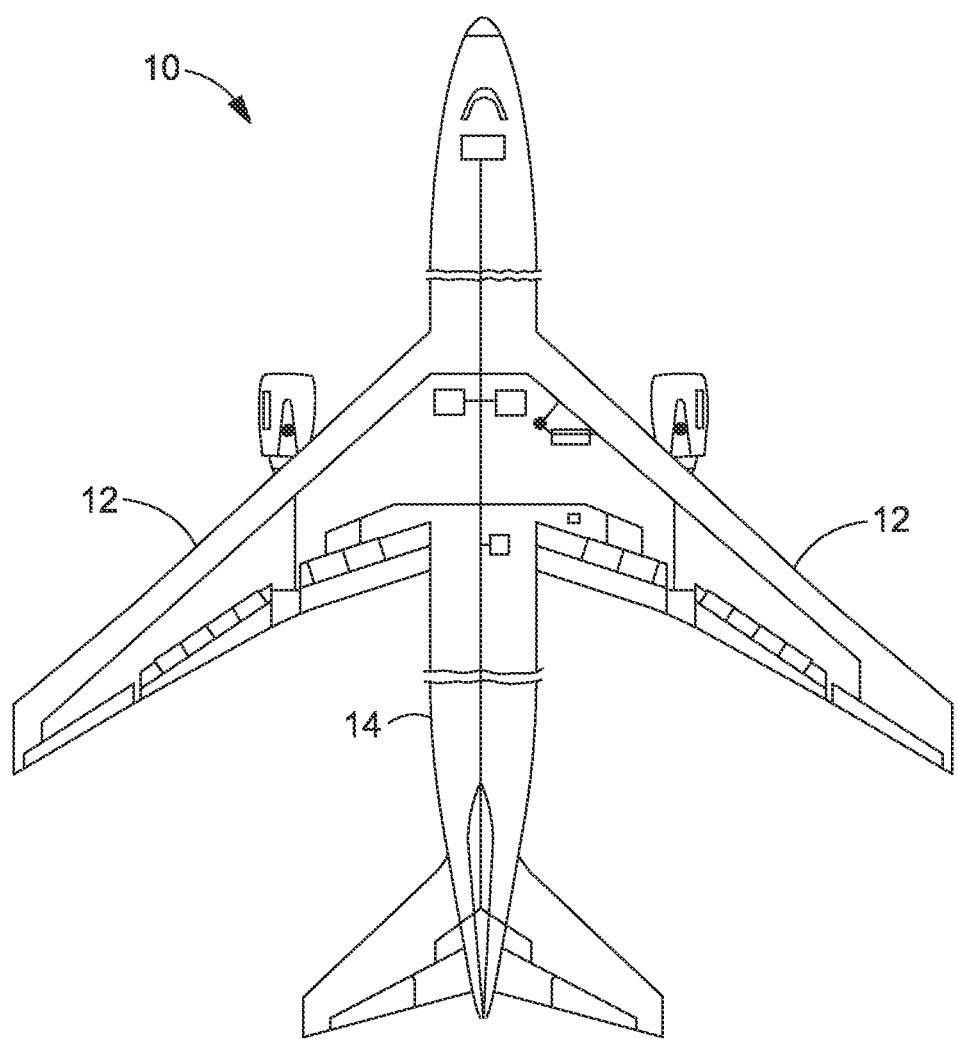
FIG. 1 is a schematic diagram of an exemplary aircraft on which embodiments of a mechanical pressure application system may be used.

Referring more particularly to the drawings, implementations of the disclosure may be described in the context of a structure such as an aircraft 10 shown schematically in FIG. 1. Various components of aircraft 10, such as, but not limited to, wings 12 and fuselage 14, include structural components that meet at a contact area. It should be understood, however, that the disclosure applies equally to other structures, including but not limited to automobiles, heavy work vehicles, other vehicles, aquatic vessels, and machinery in general.

Figure 2:
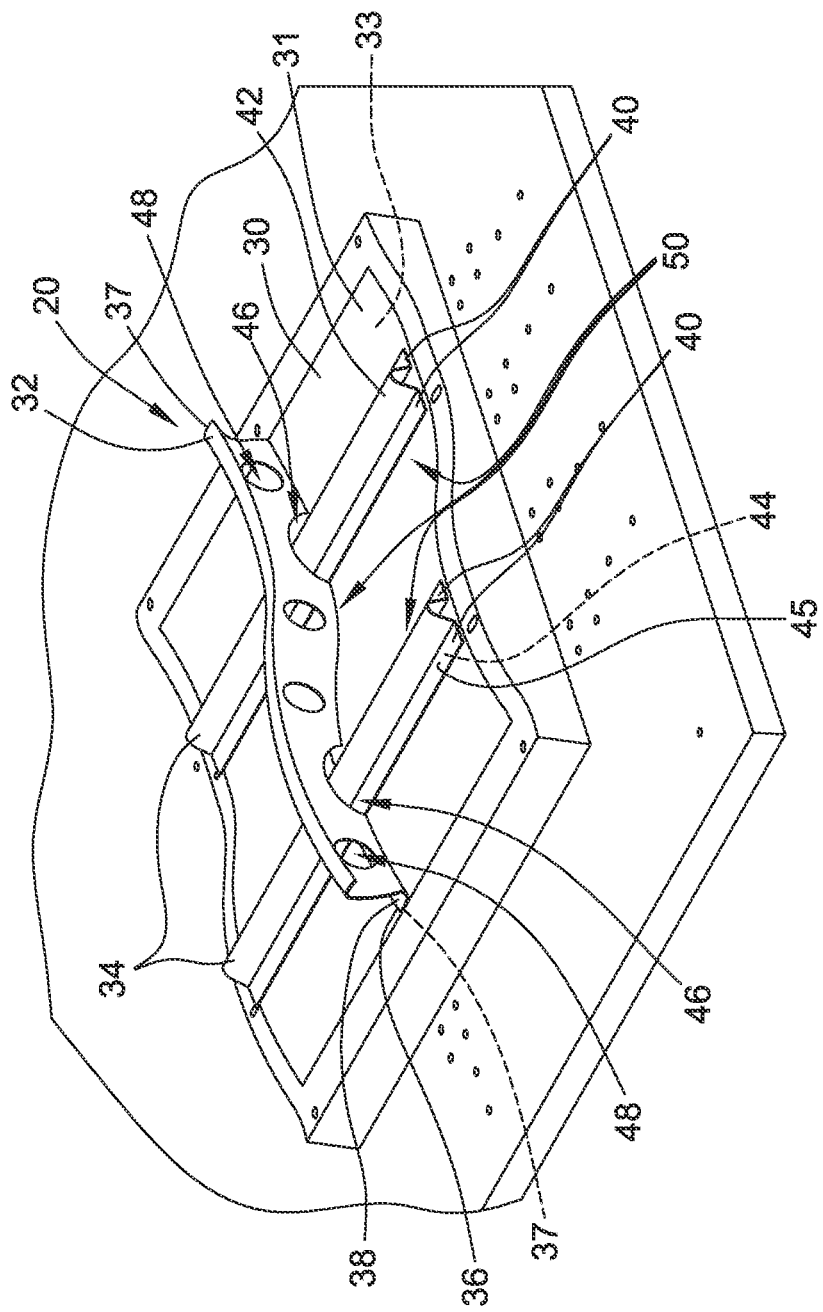
FIG. 2 is a perspective view of a first exemplary embodiment of a plurality of structural components that may be used with the aircraft shown in FIG. 1.

FIG. 2 is a perspective view of a first embodiment of a plurality of structural components 20 that may be used with, for example, aircraft 10. In the illustrated embodiment, plurality of structural components 20 includes a first structural component 30, a second structural component 32, and a plurality of third structural components 34. More specifically, first structural component 30 is a skin 30, second structural component 32 is a Z-frame stiffener 32, and plurality of third structural components 34 is a plurality of hat-shaped stiffeners 34. Each hat-shaped stiffener 34 extends through a corresponding first aperture 46 defined in Z-frame stiffener 32.

Each of plurality of structural components 20 has a first surface that is configured to interface with a first surface of another of plurality of structural components 20 at a contact area 50, and a second surface disposed generally opposite the first surface. For example, skin 30 includes a first surface 31 and an opposite second surface 33. Z-frame stiffener 32 includes a first leg 36, and first leg 36 includes a Z-frame first surface 37 that is configured to contact skin first surface 31 at contact area 50. For example, Z-frame first surface 37 is complementary to a contour of skin first surface 31. First leg 36 of Z-frame stiffener 32 also includes a Z-frame second surface 38 that is generally opposite first surface 37. Each hat-shaped stiffener 34 includes at least one flange 40. Each flange 40 includes a hat stiffener first surface 44 configured to contact skin first surface 31 at contact area 50, and a hat stiffener second surface 45 that is generally opposite first surface 44. Each hat-shaped stiffener 34 also includes a hat portion 42. In alternative embodiments, plurality of structural components 20 includes any structural components that are suitably configured to interface at a contact area.

In the illustrated embodiment, each of plurality of structural components 20 is formed from a composite material, for example, a fiber-reinforced resin composite material. In an alternative embodiment, at least a first one of plurality of structural components 20 is formed from a composite material, and at least a second one of plurality of structural components 20 is formed from a metallic material. In other alternative embodiments, each of plurality of structural components 20 is formed from any material that is suitable to interface with another of plurality of structural components 20 at a contact area.

In the illustrated embodiment, plurality of structural components 20 are configured to be bonded together using a bonding process that is facilitated by an application of pressure to at least a portion of contact area 50. In an embodiment, plurality of structural components 20 are bonded together using an adhesive on at least a portion of contact area 50. Alternatively or additionally, plurality of structural components 20 are bonded together by co-curing plurality of structural components 20 at contact area 50. Alternatively or additionally, plurality of structural components 20 are bonded together using thermoplastic welding for at least a portion of contact area 50. In certain embodiments, at least one of a thermoplastic film and a susceptor are applied to at least a portion of contact area 50 prior to thermoplastic welding. Alternatively or additionally, plurality of structural components 20 are coupled together using any suitable process that is facilitated by an application of pressure to at least a portion of contact area 50 as described herein. It should be understood that, while the illustrated embodiments are described in reference to a bonding or coupling process at contact area 50, the embodiments described herein are applicable to any process that includes an application of pressure to at least one interface between a plurality of structural components.

Figure 3:
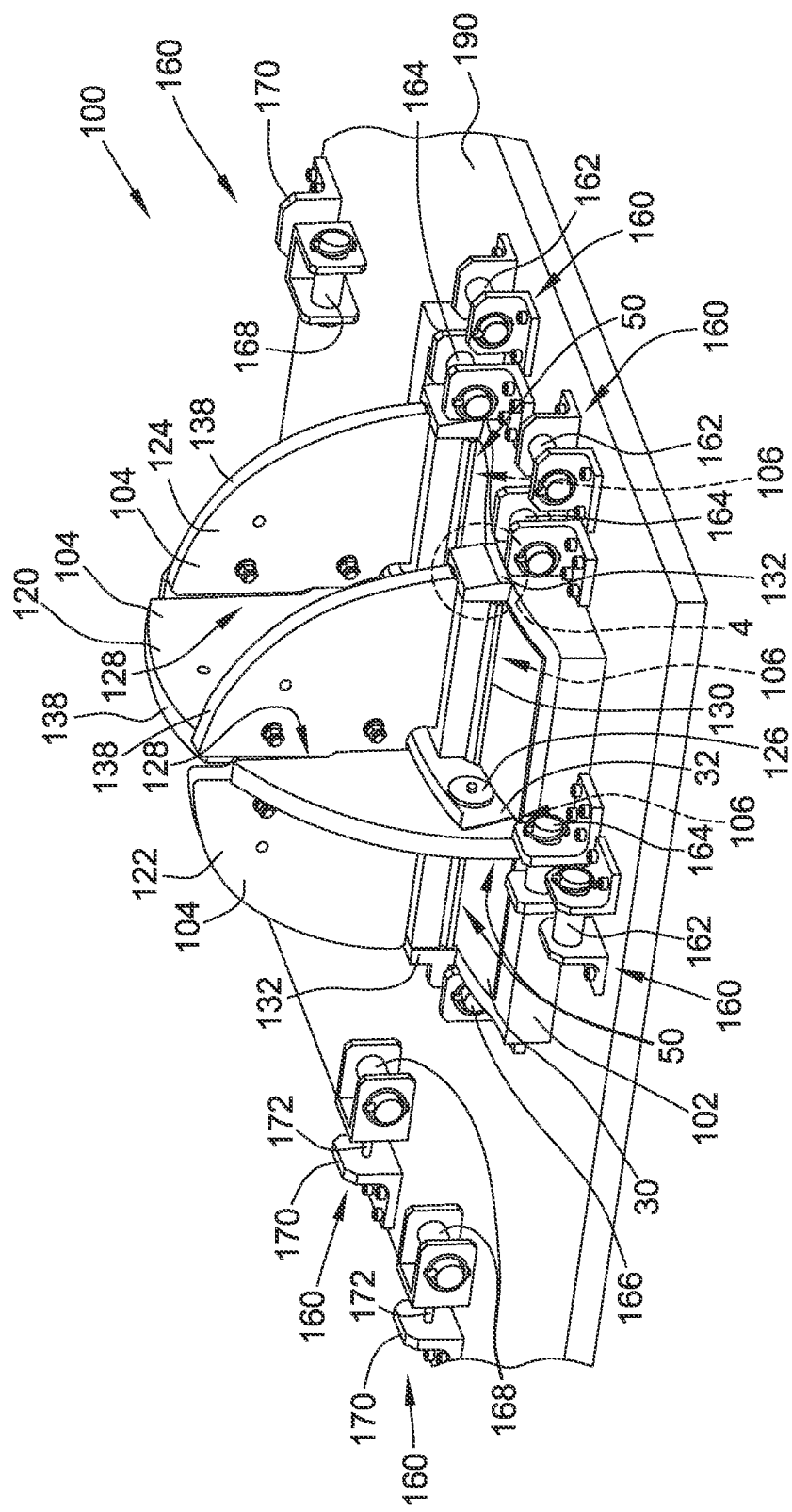
FIG. 3 is a perspective view of a first exemplary embodiment of a mechanical pressure application system that may be used to apply pressure to at least a portion of a contact area of the exemplary plurality of structural components shown in FIG. 2.

FIG. 3 is a perspective view of a first embodiment of a mechanical pressure application system 100 that may be used to apply pressure to at least a portion of contact area 50 of plurality of structural components 20. Mechanical pressure application system 100 includes a base 102 configured to support plurality of structural components 20. In certain embodiments, base 102 is configured to support plurality of structural components 20 substantially evenly. In particular embodiments, base 102 is complementary to the second surface of at least one of plurality of structural components 20. For example, in the illustrated embodiment, base 102 has a contour complementary to a contour of skin second surface 33, such that base 102 substantially evenly supports skin 30, as well as Z-frame stiffener 32 and hat-shaped stiffeners 34 arranged on skin 30.

Mechanical pressure application system 100 also includes at least one tooling block 104. Each at least one tooling block 104 is configured to be positioned adjacent at least one of plurality of structural components 20. In the illustrated embodiment, the at least one tooling block 104 includes a first tooling block 120 positioned adjacent Z-frame stiffener 32, and a second tooling block 122 and a third tooling block 124 each positioned adjacent a respective hat-shaped stiffener 34 (shown in FIG. 2). In certain embodiments, each at least one tooling block 104 is configured to removably couple to at least one of base 102 and at least one of plurality of structural components 20 to facilitate maintaining the tooling block 104 in a desired position. Additionally or alternatively, each at least one tooling block 104 is configured to removably couple to another of the at least one tooling blocks 104. In an embodiment, a first of the at least one tooling blocks 104 is configured to removably couple to a second of the at least one tooling blocks 104 such that the second at least one tooling block 104 facilitates a lateral stability of the first at least one tooling block 104, but does not facilitate a transfer of force between the first and second at least one tooling blocks 104 in a direction generally normal to base 102. Alternatively, a first and second of the at least one tooling blocks 104 are configured to removably couple together such that a transfer of force between the first and second at least one tooling blocks 104 is facilitated in a direction generally normal to base 102 In alternative embodiments, any suitable method is used to facilitate maintaining each tooling block 104 in a desired position.

For example, in the illustrated embodiment, first tooling block 120 is configured to removably couple to second apertures 48 (shown in FIG. 2) defined in Z-frame stiffener 32 using fasteners 126, and each of second tooling block 122 and third tooling block 124 are configured to removably slidably couple to a respective slot 128 defined in first tooling block 120, such that lateral stability of each of second tooling block 122 and third tooling block 124, but not transfer of force from first tooling block 120 in a direction generally normal to base 102, is facilitated. Additionally, each of second tooling block 122 and a third tooling block 124 includes a pair of end caps 132 configured to abut base 102. In a particular embodiment, each end cap 132 is configured to removably couple to a respective dowel (not shown) disposed on base 102 to further facilitate maintaining each of second tooling block 122 and third tooling block 124 in the desired position. Thus, base 102 and the at least one tooling block 104 are configured to removably couple to plurality of structural components 20 in a desired configuration to facilitate bonding of plurality of structural components 20.

Each tooling block 104 is configured to transmit a force to at least one of plurality of structural components 20, such that pressure is applied to a corresponding portion of contact area 50. More specifically, each tooling block 104 includes a first surface 106 that is configured to be positioned proximate the second surface of at least one of plurality of structural components 20 when base 102 and the at least one tooling block 104 are coupled to plurality of structural components 20. Thus, each tooling block first surface 106 is configured to transmit a force to the second surface of the at least one structural component 20. In the illustrated embodiment, first surface 106 of first tooling block 120 is complementary to a contour of Z-frame second surface 38, such that tooling block first surface 106 is positionable against Z-frame second surface 38. First surface 106 of first tooling block 120 is positioned proximate Z-frame second surface 38 such that tooling block first surface 106 is configured to transmit a force to Z-frame second surface 38.

It should be understood that tooling block first surface 106 need not be positioned directly against the second surface of the at least one structural component 20. For example, in certain embodiments, a buffer 130 is disposed between tooling block first surface 106 and the second surface of the at least one structural component 20. In certain embodiments, buffer 130 transmits a more even load distribution from tooling block first surface 106 to the second surface of the at least one structural component 20. Alternatively or additionally, buffer 130 is formed from a material that is relatively soft compared to a material used to form tooling block 104, such that buffer 130 facilitates a protection of structural and/or cosmetic integrity of plurality of structural components 20. In the illustrated embodiment, buffer 130 is disposed between each hat stiffener second surface 45 (shown in FIG. 2) and first surface 106 of the corresponding one of second tooling block 122 and third tooling block 124.

Figure 4:
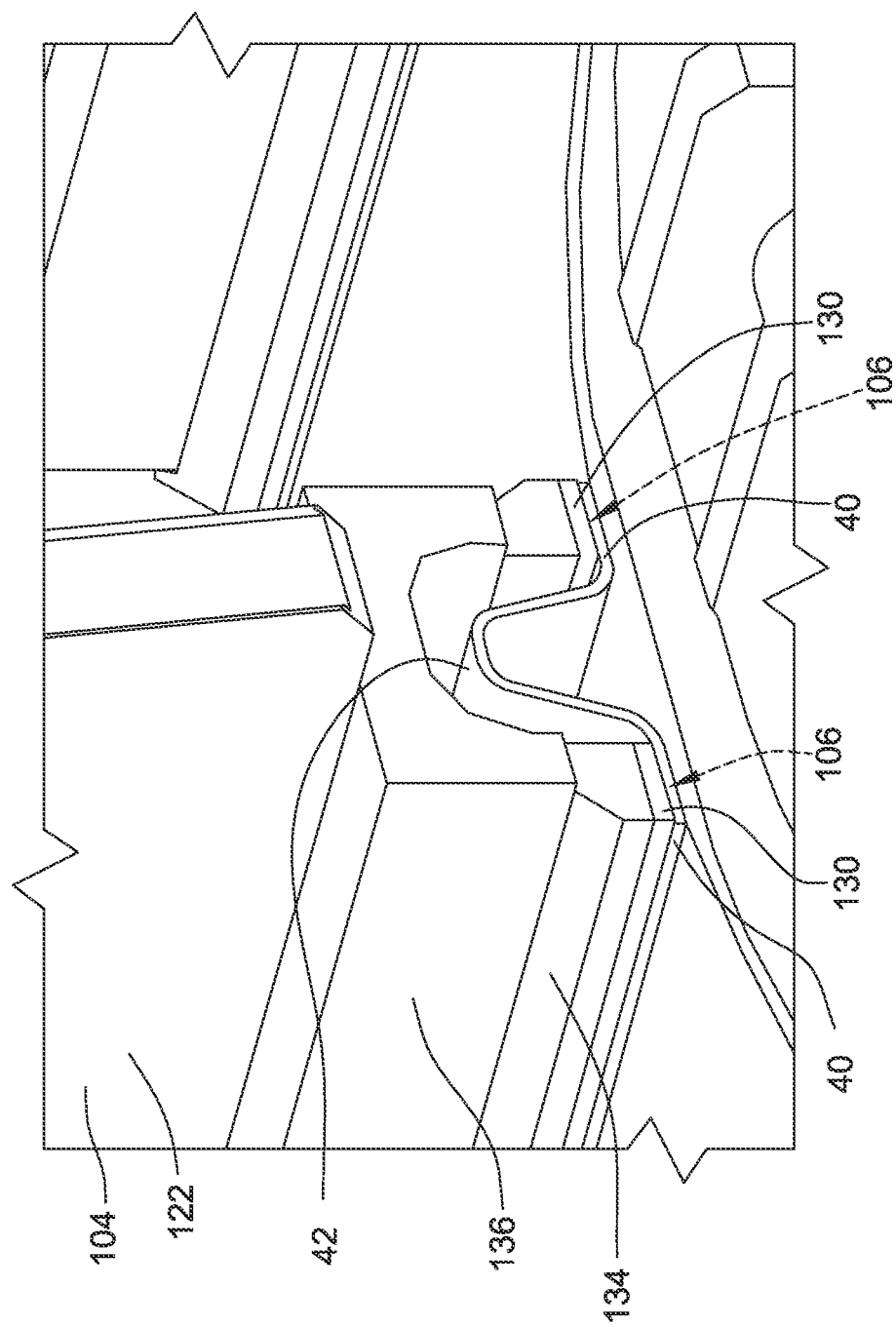
FIG. 4 is an enlarged perspective view of a portion of the exemplary mechanical pressure application system shown in FIG. 3.

FIG. 4 is an enlarged perspective view of a portion of mechanical pressure application system 100 identified by the reference 4 in FIG. 3. In the view of FIG. 4, end cap 132 is cut away to show details of an interface between second tooling block 122 and a corresponding hat-shaped stiffener 34. In the illustrated embodiment, a portion of tooling block first surface 106 is positioned adjacent each respective flange 40 on opposite sides of hat portion 42, such that tooling block first surface 106 does not contact hat portion 42. Tooling block first surface 106 is configured to press against each hat stiffener second surface 45 (shown in FIG. 2), such that second tooling block 122 transmits force to flanges 40 and pressure is applied to a portion of contact area 50 disposed adjacent to flanges 40. As discussed above, in the illustrated embodiment, buffer 130 is disposed between each hat stiffener second surface 45 and tooling block first surface 106.

In certain embodiments, the at least one tooling block 104 is configured to apply pressure to a portion of contact area 50 that is obstructed by one of plurality of structural components 20. For example, in the illustrated embodiment, second tooling block 122 includes a first base portion 134 and a second base portion 136. Second base portion 136 is divided into two segments by Z-frame stiffener 32 (shown in FIG. 2), and is configured to transmit force to first base portion 134. First base portion 134 is configured to directly contact buffer 130 and/or each hat stiffener second surface 45. However, first base portion 134 extends, along with hat-shaped stiffener 34, through the corresponding first aperture 46 (shown in FIG. 2) of Z-frame stiffener 32. Thus, first base portion 134 is configured to distribute force received from second base portion 136 to portions of hat stiffener second surface 45 proximate first aperture 46 that are obstructed by Z-frame stiffener 32. In certain embodiments, each of first base portion 134 and second base portion 136 are formed separately and coupled to second tooling block 122 in any suitable fashion. In an embodiment, third tooling block 124 also includes first base portion 134 and second base portion 136 as described above.

Figure 5:
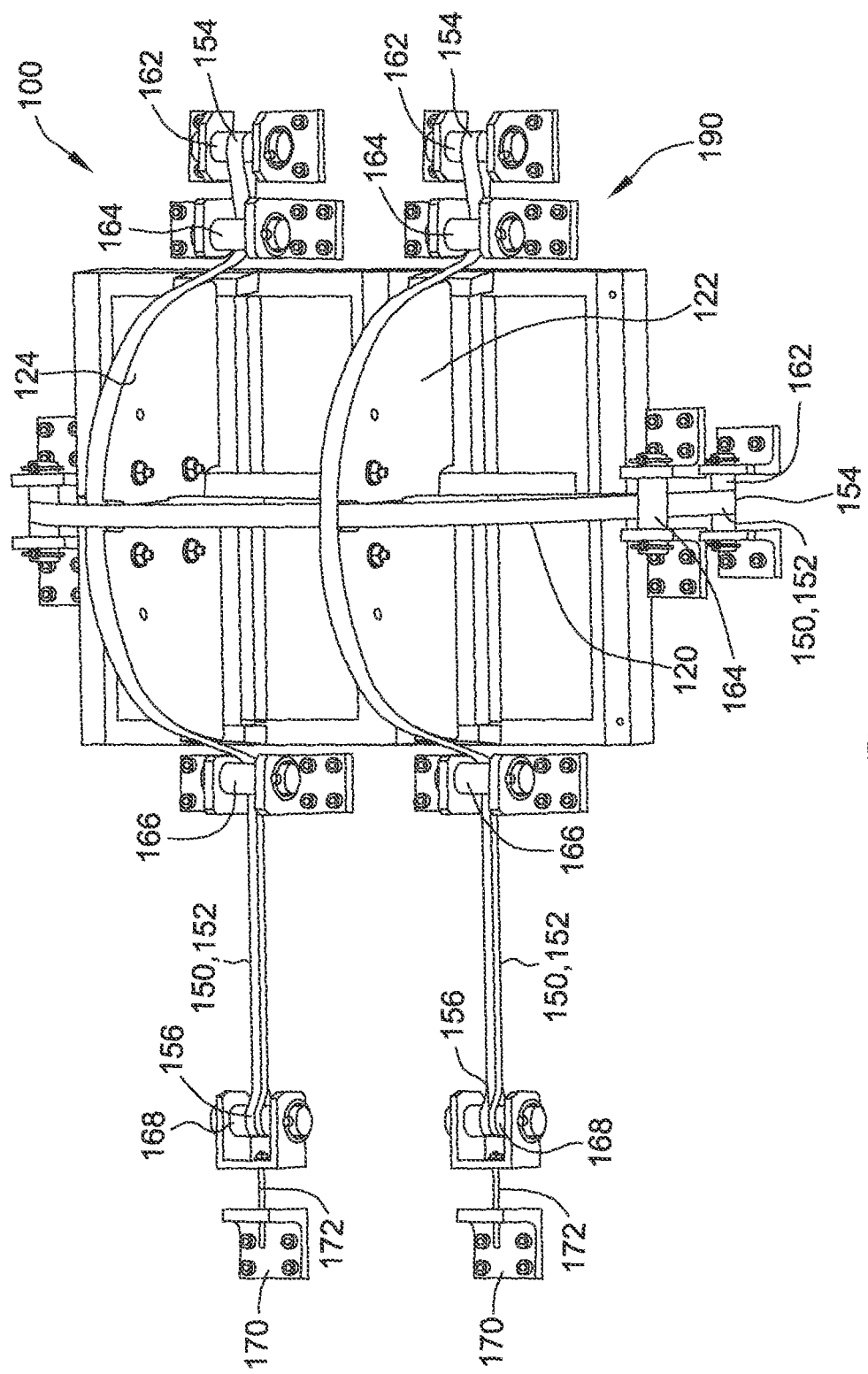
FIG. 5 is another perspective view of the exemplary mechanical pressure application system shown in FIG. 3.

FIG. 5 is another perspective view of the first embodiment of mechanical pressure application system 100. Mechanical pressure application system 100 includes at least one forcing member 150 associated with the at least one tooling block 104. With reference to FIG. 3 and FIG. 5, each of the at least one tooling blocks 104 includes a second surface 138 disposed generally opposite first surface 106. Each tooling block second surface 138 is configured to receive at least one forcing member 150. More specifically, each tooling block second surface 138 is configured to receive the at least one forcing member 150 such that a force is transmitted from the at least one forcing member 150 through the tooling block 104 to the corresponding portion of contact area 50. Each tooling block second surface 138 is configured such that the tooling block 104 distributes the force from the corresponding at least one forcing member 150 across tooling block first surface 106 in a predetermined fashion.

For example, in the illustrated embodiment, the at least one forcing member 150 is at least one strap 152, and each strap 152 is associated with a corresponding one of tooling blocks 104. More specifically, each of first tooling block 120, second tooling block 122, and third tooling block 124 includes second surface 138 that is substantially smooth and arcuate in shape, and each tooling block second surface 138 is configured to receive a corresponding strap 152. Moreover, tooling blocks 104 are arranged such that straps 152 do not interfere with each other during operation of mechanical pressure application system 100. In the illustrated embodiment, tooling blocks 104 are arranged such that the strap 152 received by third tooling block 124 passes between third tooling block 124 and the strap 152 received by first tooling block 120, without contact between the straps 152. Similarly, the strap 152 received by first tooling block 120 passes between first tooling block 120 and the strap 152 received by second tooling block 122, without contact between the straps 152. In certain embodiments, at least one property of each strap 152, such as but not limited to a material from which strap 152 is fabricated, a thickness of strap 152, and a width of strap 152, is selected to meet a force requirement of mechanical pressure application system 100.

The smooth, arcuate shape of tooling block second surface 138 is configured such that the tooling block 104 distributes the received force from the corresponding strap 152 across tooling block first surface 106 substantially evenly to the corresponding portion of contact area 50 (shown in FIG. 2). In particular, first tooling block 120 transmits force from the corresponding received strap 152 to a portion of contact area 50 between Z-frame first surface 37 and skin first surface 31, and second tooling block 122 and third tooling block 124 each transmit force from the respective corresponding received strap 152 to a portion of contact area 50 between a respective hat stiffener first surface 44 and skin first surface 31.

Mechanical pressure application system 100 also includes at least one biasing mechanism 160 associated with the at least one forcing member 150. The at least one biasing mechanism 160 is configured to apply a predetermined load to the at least one forcing member 150, such that the at least one forcing member 150 transmits the force to the at least one tooling block 104 that is distributed to at least a portion of contact area 50, as described above. The at least one biasing mechanism 160 also is configured to mechanically sustain the predetermined load over a desired period of time, such as a cure time for an adhesive applied to contact area 50.

In the illustrated embodiment, the at least one biasing mechanism 160 includes, for each strap 152, a first end pin 162, a first transitional pin 164, a second transitional pin 166, and a second end pin 168. Each strap 152 extends from a first end 154 to a second end 156. More specifically, each strap 152 extends from a corresponding first end pin 162, extends at least partially around a corresponding first transitional pin 164, substantially traverses a corresponding tooling block second surface 138, extends partially around a corresponding second transitional pin 166, and extends to a corresponding second end pin 168. Each strap 152 is coupled at first end 154 to the corresponding first end pin 162, and is coupled at second end 156 to the corresponding second end pin 168.

In certain embodiments, first end pin 162 is fixed relative to base 102 in any suitable fashion, such as by, while second end pin 168 is adjustably fixed relative to base 102 in any suitable fashion. Second end pin 168 is adjustable to adjust a force applied by strap 152 to the corresponding tooling block second surface 138. For example, in the illustrated embodiment, first end pin 162 and base 102 each are coupled to a platform 190, while second end pin 168 is coupled to a fixed bracket 170 coupled to platform 190 through a threaded key 172. Threaded key 172 is configured to adjust a linear position of second end pin 168 relative to first end pin 162, and thus to adjust a tension applied to strap 152 to apply the predetermined load to strap 152. Threaded key 172 also is configured to mechanically sustain the tension over a desired period of time, such as a cure time for an adhesive applied to contact area 50, for example through the use of a locking nut (not shown). In alternative embodiments, first end pin 162 also is adjustably fixed relative to base 102.

The predetermined load applied to strap 152 at least partially determines the force applied by strap 152 to the corresponding tooling block second surface 138. In the illustrated embodiment, because a separate biasing mechanism 160 is associated with each strap 152, the force transmitted from each strap 152 through the corresponding tooling block 104 to the corresponding portion of contact area 50 may be different for each tooling block 104. Thus, the pressure applied to each corresponding portion of contact area 50 is separately adjustable by adjusting a tension in the corresponding strap 152.

Figure 6:
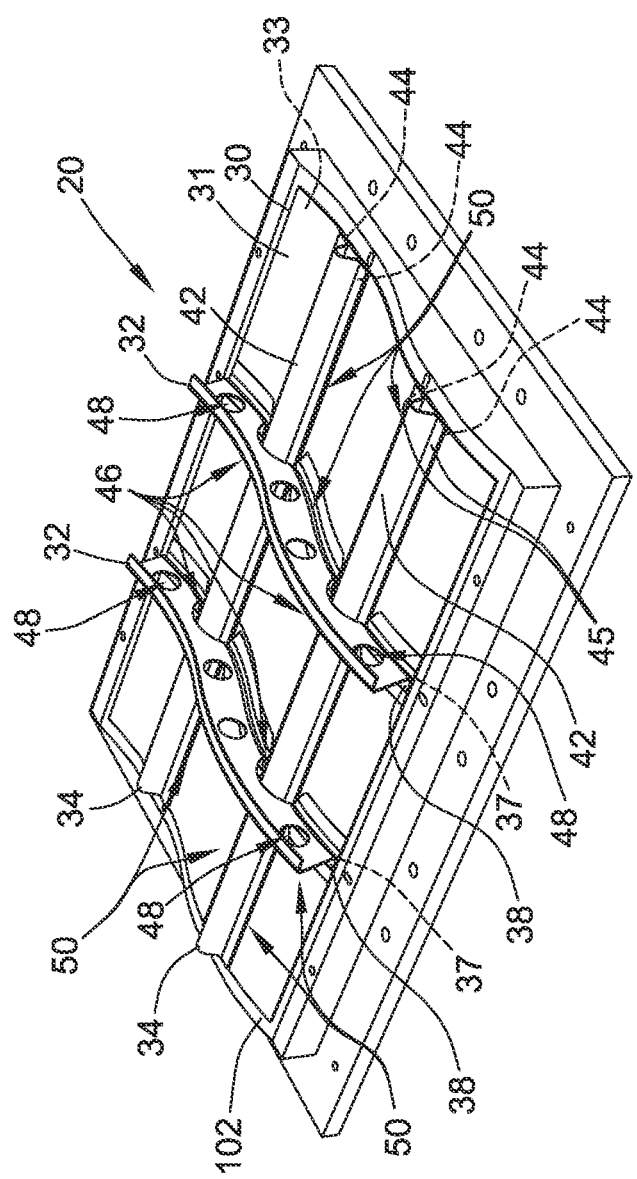
FIG. 6 is a perspective view of a second exemplary embodiment of a plurality of structural components that may be used with the aircraft shown in FIG. 1.

FIG. 6 is a perspective view of a second embodiment of plurality of structural components 20 that may be used with, for example, aircraft 10 (shown in FIG. 1). In the illustrated embodiment, plurality of structural components 20 includes a first structural component 30, a plurality of second structural components 32, and a plurality of third structural components 34. More specifically, first structural component 30 is skin 30, plurality of second structural components 32 is a plurality of Z-frame stiffeners 32, and plurality of third structural components 34 is a plurality of hat-shaped stiffeners 34. Each hat-shaped stiffener 34 extends through corresponding first aperture 46 defined in each Z-frame stiffener 32.

As with the embodiment illustrated in FIG. 2, skin 30 includes first surface 31 and opposite second surface 33, each Z-frame stiffener 32 includes Z-frame first surface 37 configured to contact skin first surface 31 and opposite Z-frame second surface 38, and each hat-shaped stiffener 34 includes hat stiffener first surface 44 configured to contact skin first surface 31, hat stiffener second surface 45 that is generally opposite first surface 44, and hat portion 42. Contact area 50 is defined between skin first surface 31 and each Z-frame first surface 37, and between skin first surface 31 and each hat stiffener first surface 44. As described above, plurality of structural components 20 are configured to be bonded together using a bonding process that is facilitated by an application of pressure to contact area 50.

Figure 7:
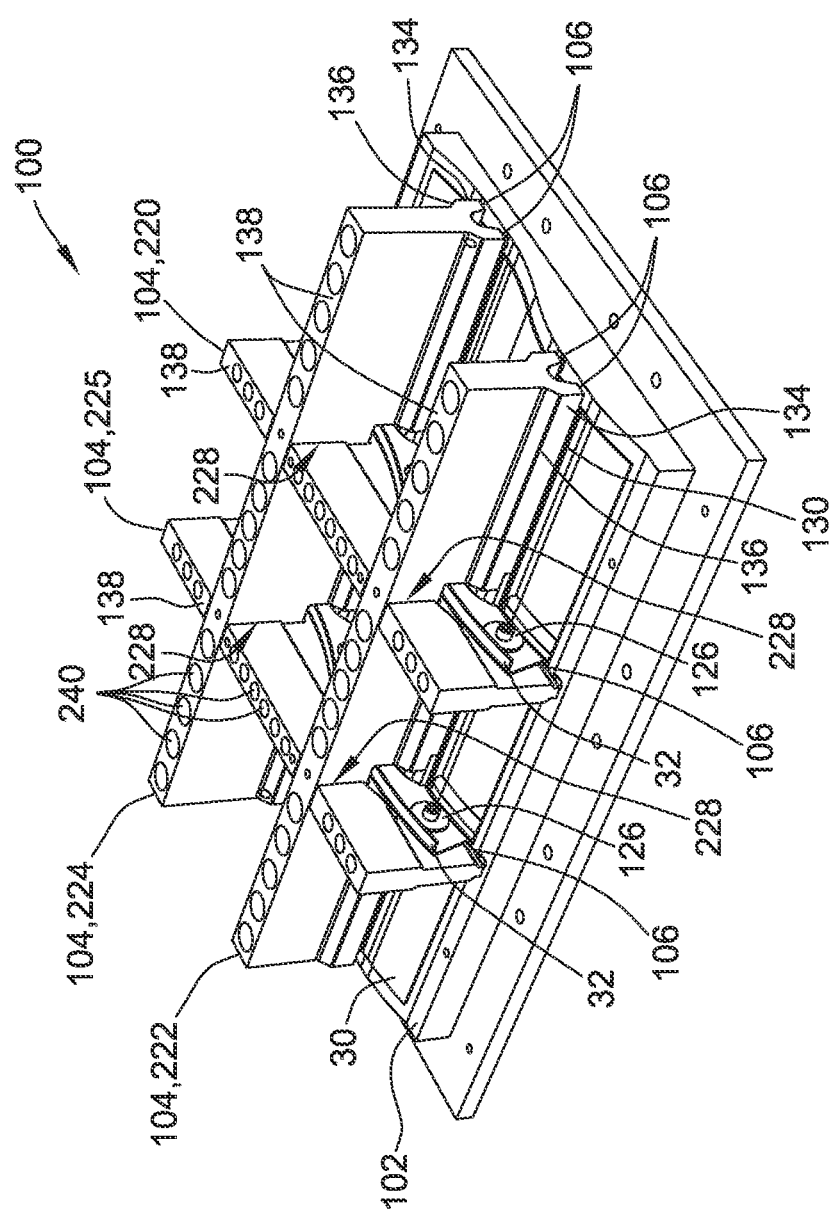
FIG. 7 is a perspective view of a second exemplary embodiment of a mechanical pressure application system that may be used to apply pressure to at least a portion of a contact area of the exemplary plurality of structural components shown in FIG. 6.

FIG. 7 is a perspective view of a second embodiment of mechanical pressure application system 100 that may be used to apply pressure to contact area 50 of plurality of structural components 20. As described above with respect to FIG. 3, mechanical pressure application system 100 includes base 102, which is configured to support plurality of structural components 20, and at least one tooling block 104 configured to removably couple to plurality of structural components 20 in a desired configuration to facilitate bonding of plurality of structural components 20. Each at least one tooling block 104 is configured to be positioned adjacent at least one of plurality of structural components 20. Also as described above, each tooling block 104 is configured to transmit a force to at least one of plurality of structural components 20, such that pressure is applied to a corresponding portion of contact area 50 (shown in FIG. 6). More specifically, each tooling block 104 includes a first surface 106 configured to be positioned proximate the second surface of at least one of plurality of structural components 20 when base 102 and the at least one tooling block 104 are coupled to plurality of structural components 20, such that the tooling block first surface 106 is configured to transmit the force to the second surface of the at least one structural component 20.

In the illustrated embodiment of FIG. 7, the at least one tooling block 104 includes a first tooling block 220 and a fourth tooling block 225 each positioned adjacent a respective Z-frame stiffener 32, and a second tooling block 222 and a third tooling block 224 each positioned adjacent a respective hat-shaped stiffener 34 (shown in FIG. 6). In the illustrated embodiment, each of first tooling block 220 and fourth tooling block 225 includes a first surface 106 that is complementary to a contour of a respective Z-frame second surface 38, such that each tooling block first surface 106 is positionable against Z-frame second surface 38. In certain embodiments, buffer 130 is disposed between tooling block first surface 106 and the second surface of the at least one structural component 20. Also, as described above, the at least one tooling block 104 is configured to apply pressure to a portion of contact area 50 that is obstructed by one of plurality of structural components 20. More specifically, each of second tooling block 222 and third tooling block 224 includes first base portion 134 configured to directly contact buffer 130 and/or each hat stiffener second surface 45, and second base portion 136 configured to transmit force to first base portion 134. As described above, first base portion extends, along with a respective hat-shaped stiffener 34, through the corresponding first aperture 46 (shown in FIG. 6) of Z-frame stiffener 32, while second base portion 136 is divided into two segments by the respective Z-frame stiffener 32.

As described above, in certain embodiments, each at least one tooling block 104 is configured to removably couple to at least one of base 102 and at least one of plurality of structural components 20 to facilitate maintaining the tooling block 104 in a desired position. Additionally or alternatively, each at least one tooling block 104 is configured to removably couple to another of the at least one tooling blocks 104. In an embodiment, a first of the at least one tooling blocks 104 is configured to removably couple to a second of the at least one tooling blocks 104 such that the second at least one tooling block 104 facilitates a lateral stability of the first at least one tooling block 104, but does not facilitate a transfer of force between the first and second at least one tooling blocks 104 in a direction generally normal to base 102. Alternatively, a first and second of the at least one tooling blocks 104 are configured to removably couple together such that a transfer of force between the first and second at least one tooling blocks 104 is facilitated in a direction generally normal to base 102. In alternative embodiments, any suitable method is used to facilitate maintaining each tooling block 104 in a desired position. For example, in the illustrated embodiment, each of first tooling block 220 and fourth tooling block 225 is configured to removably couple to second apertures 48 (shown in FIG. 6) defined in a respective Z-frame stiffener 32 using fasteners 126, and each of second tooling block 222 and third tooling block 224 are configured to removably slidably couple to respective slots 228 defined in first tooling block 220 and fourth tooling block 225, such that lateral stability of each of second tooling block 222 and third tooling block 224, but not transfer of force from either of first tooling block 220 and fourth tooling block 225 in a direction generally normal to base 102, is facilitated.

Figure 8:
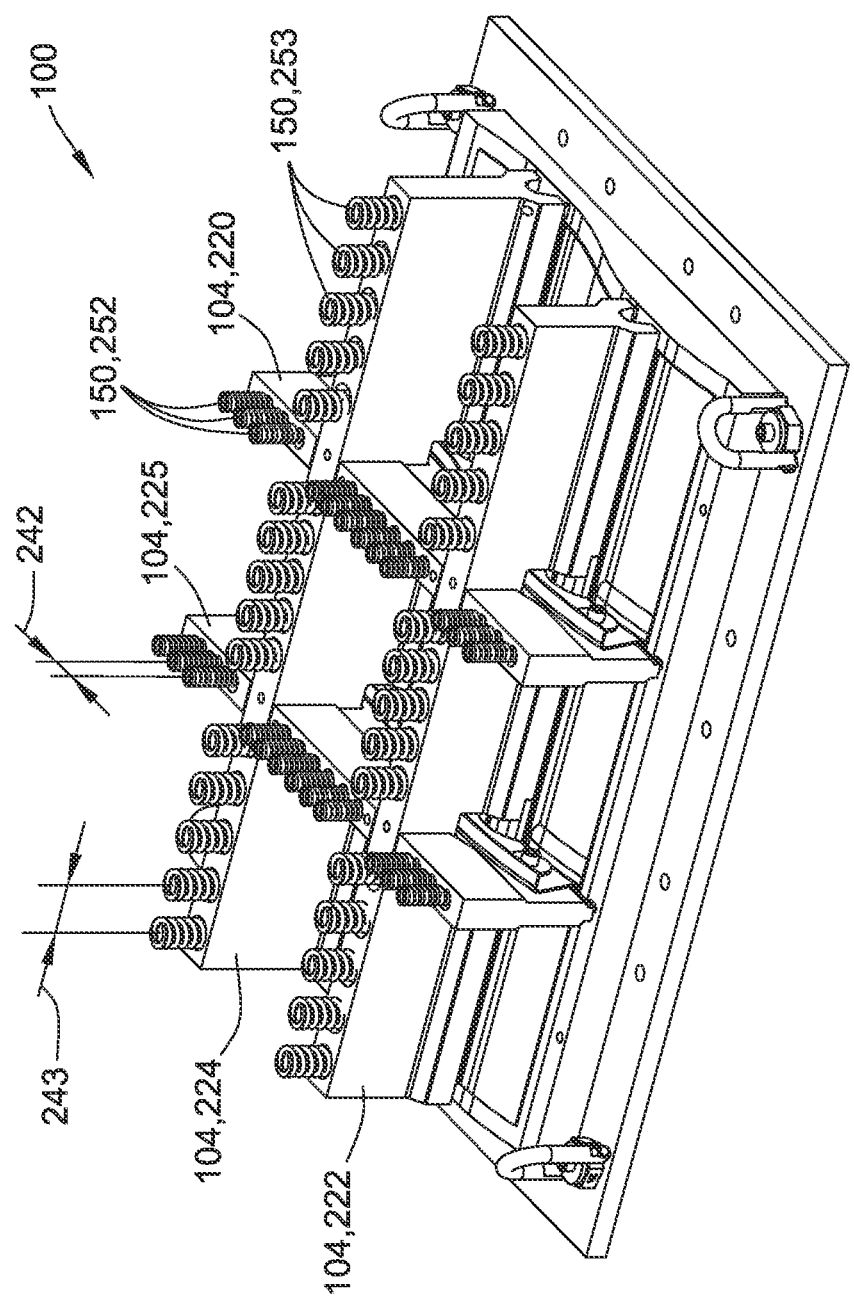
FIG. 8 is another perspective view of the exemplary mechanical pressure application system shown in FIG. 7.

FIG. 8 is another perspective view of the second embodiment of mechanical pressure application system 100. With reference to FIG. 7 and FIG. 8, mechanical pressure application system 100 includes at least one forcing member 150 associated with the at least one tooling block 104. As described for the embodiment illustrated in FIGS. 3-5, each of the at least one tooling blocks 104 includes a second surface 138 disposed generally opposite first surface 106. Each tooling block second surface 138 is configured to receive at least one forcing member 150 such that a force is transmitted from the at least one forcing member 150 through the tooling block 104 to the corresponding portion of contact area 50 in a predetermined fashion.

For example, in the illustrated embodiment, the at least one forcing member 150 is a plurality of springs that includes a first plurality of springs 252 and a second plurality of springs 253. Each tooling block 104 includes a plurality of apertures 240 defined in tooling block second surface 138, and each aperture 240 is configured to receive a corresponding spring from among first plurality of springs 252 and second plurality of springs 253. More specifically, each aperture 240 of first tooling block 220 and fourth tooling block 225 is configured to receive a corresponding one of first plurality of springs 252, and each aperture 240 of second tooling block 222 and third tooling block 224 is configured to receive a corresponding one of second plurality of springs 253.

Each tooling block second surface 138 is configured such that the tooling block 104 distributes the received force from the corresponding received one of plurality of springs 252 and 253 across tooling block first surface 106 in a predetermined fashion to the corresponding portion of contact area 50 (shown in FIG. 6). For example, a first spacing 242 between each pair of apertures 240 of first tooling block 220 and fourth tooling block 225 is selected to distribute the force applied by first plurality of springs 252 in a first predetermined fashion to a portion of contact area 50 between Z-frame first surfaces 37 and skin first surface 31, and a second spacing 243 between each pair of apertures 240 of second tooling block 222 and third tooling block 224 is selected to distribute the force applied by second plurality of springs 253 in a second predetermined fashion to a portion of contact area 50 between hat stiffener first surfaces 44 and skin first surface 31.

In the illustrated embodiment, first spacing 242 is substantially constant between each pair of apertures 240 defined in second surface 138 of first tooling block 220 and fourth tooling block 225, and second spacing 243 is substantially constant between each pair of apertures 240 defined in second surface 138 of second tooling block 222 and third tooling block 224, with the exception of apertures 240 adjacent to slots 228, such that each of first tooling block 220, second tooling block 222, third tooling block 224, and fourth tooling block 225 distributes the received force from the corresponding received springs 252 or 253 across the respective tooling block first surface 106 substantially evenly to the corresponding portion of contact area 50 (shown in FIG. 6). In alternative embodiments, at least one of first spacing 242 and second spacing 243 varies between certain pairs of apertures 240, such that at least one tooling block 104 distributes the received force from the corresponding received springs 252 or 253 substantially unevenly to the corresponding portion of contact area 50. In the illustrated embodiment, first spacing 242 differs from second spacing 243, such that first tooling block 220 and fourth tooling block 225 are configured to apply a force to Z-frame second surfaces 38 that differs from a force applied by second tooling block 222 and third tooling block 224 to hat stiffener second surfaces 45. In alternative embodiments, first spacing 242 is substantially equal to second spacing 243. Thus, the pressure applied to each corresponding portion of contact area 50 is separately adjustable based on a selection of at least one of first spacing 242 and second spacing 243 between each pair of adjacent apertures 240.

Additionally or alternatively, the plurality of springs 252 and 253 is configured such that each tooling block 104 distributes the received force from the corresponding received one of plurality of springs 252 and 253 across tooling block first surface 106 in a predetermined fashion to the corresponding portion of contact area 50 (shown in FIG. 6). For example, a number of springs in first plurality of springs 252 is selected such that first tooling block 220 and fourth tooling block 225 distribute the force applied by first plurality of springs 252 in a first predetermined fashion to a portion of contact area 50 between Z-frame first surfaces 37 and skin first surface 31, and a number of springs in second plurality of springs 253 is selected such that second tooling block 222 and third tooling block 224 distribute the force applied by second plurality of springs 253 in a second predetermined fashion to a portion of contact area 50 between hat stiffener first surfaces 44 and skin first surface 31. For another example, a spring property of each of first plurality of springs 252, such as but not limited to at least one of a spring stiffness, a diameter, and an unforced length, is selected such that first tooling block 220 and fourth tooling block 225 distribute the force applied by first plurality of springs 252 in a first predetermined fashion to a portion of contact area 50 between Z-frame first surfaces 37 and skin first surface 31, and the spring property of each of second plurality of springs 253 is selected such that second tooling block 222 and third tooling block 224 distribute the force applied by second plurality of springs 253 in a second predetermined fashion to a portion of contact area 50 between hat stiffener first surfaces 44 and skin first surface 31.

In the illustrated embodiment, the spring property is substantially constant for each spring of first plurality of springs 252, and the spring property is substantially constant for each spring of second plurality of springs 253, such that each of first tooling block 220, second tooling block 222, third tooling block 224, and fourth tooling block 225 distributes the received force from the corresponding received springs 252 or 253 across the respective tooling block first surface 106 substantially evenly to the corresponding portion of contact area 50 (shown in FIG. 6). In alternative embodiments, the spring property varies among at least some of first plurality of springs 252, and/or varies among at least some of second plurality of springs 253, such that at least one tooling block 104 distributes the received force from the corresponding received springs 252 or 253 substantially unevenly to the corresponding portion of contact area 50. In the illustrated embodiment, the spring property among each of first plurality of springs 252 is a first constant, and the spring property among each of second plurality of springs 253 is a second constant that differs from the first constant, such that first tooling block 220 and fourth tooling block 225 are configured to apply a force to Z-frame second surfaces 38 that differs from a force applied by second tooling block 222 and third tooling block 224 to hat stiffener second surfaces 45. In alternative embodiments, the first constant is substantially equal to the second constant. Thus, the pressure applied to each corresponding portion of contact area 50 is separately adjustable based on a relative difference in the spring property for first plurality of springs 252 as compared to the spring property for second plurality of springs 253.

Figure 9:
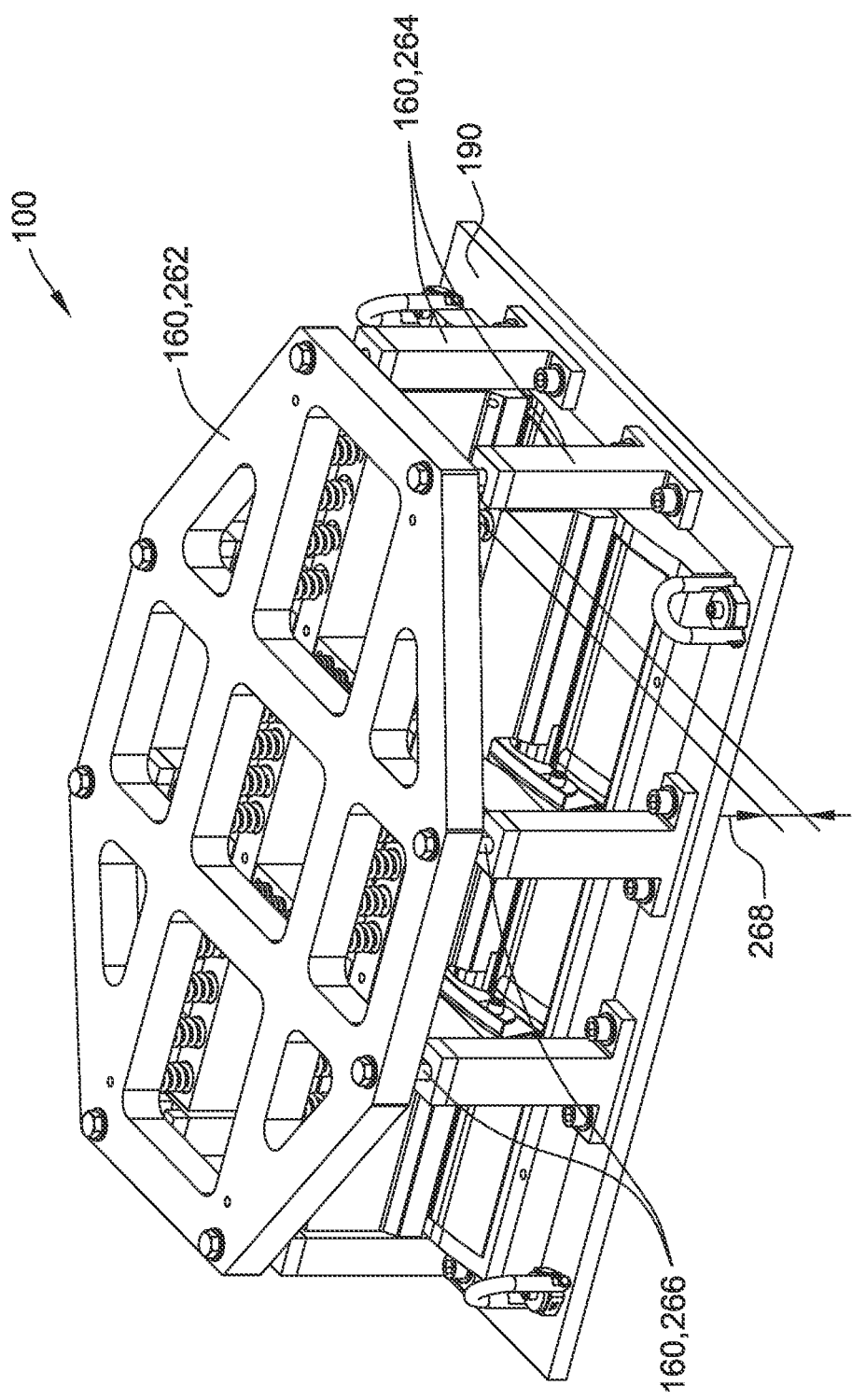
FIG. 9 is yet another perspective view of the exemplary mechanical pressure application system shown in FIG. 7.

FIG. 9 is another perspective view of the second embodiment of mechanical pressure application system 100. With reference to FIGS. 7-9, as described above, mechanical pressure application system 100 also includes at least one biasing mechanism 160 associated with the at least one forcing member 150. The at least one biasing mechanism 160 is configured to apply a predetermined load to the at least one forcing member 150, such that the at least one forcing member 150 transmits the force to the at least one tooling block 104 that is distributed to at least a portion of contact area 50. In the illustrated embodiment, the at least one biasing mechanism 160 includes at least one displacement block 262 movably coupled to a plurality of spacers 266. The at least one displacement block 262 is configured to adjustably bias plurality of springs 252 and 253 such that plurality of springs 252 and 253 apply a corresponding force to each tooling block second surface 138, as described above. The at least one displacement block 262 and spacers 266 also are configured to mechanically sustain the force over a desired period of time, such as a cure time for an adhesive applied to contact area 50, for example through the use of a locking nut (not shown).

More specifically, in the illustrated embodiment, each spacer 266 is a threaded bolt that extends through an aperture in the at least one displacement block 262 into platform 190. Each spacer 266 is adjustable to set a distance 268 between the at least one displacement block 262 and each tooling block second surface 138. Distance 268 determines a displacement of plurality of springs 252 and 253, which at least partially determines a corresponding force applied by plurality of springs 252 and 253 to each tooling block second surface 138. Each spacer 266 also is configured to mechanically sustain the displacement over a desired period of time, such as a cure time for an adhesive applied to contact area 50, for example through the use of a locking nut (not shown). In the illustrated embodiment, a spacer block 264 is removably positioned adjacent each spacer 266 to indicate a desired adjustment position for the corresponding spacer 266 that will result in the desired distance 268.

The pressure applied to each corresponding portion of contact area 50 is separately adjustable by adjusting spacers 266. In the illustrated embodiment, the at least one displacement block 262 is a single displacement block 262 that applies a substantially equal displacement to each one of plurality of springs 252 and 253. In an alternative embodiment, the single displacement block 262 applies a substantially unequal displacement to certain ones of plurality of springs 252 and 253. For example, but not by way of limitation, the single displacement block 262 has a sloped, stepped, or notched shape (not shown). In other alternative embodiments, the at least one displacement block 262 is a plurality of displacement blocks that each has a separately adjustable distance 268, such that a substantially unequal displacement is applied to certain ones of plurality of springs 252 and 253.

Although the illustrated embodiments show first tooling block 120, second tooling block 122, and third tooling block 124 illustrated in FIG. 3 used separately from first tooling block 220, second tooling block 222, third tooling block 224, and fourth tooling block 225 illustrated in FIG. 7, it should be understood that, in alternative embodiments, any one of first tooling block 120, second tooling block 122, and third tooling block 124 illustrated in FIG. 3 and first tooling block 220, second tooling block 222, third tooling block 224, and fourth tooling block 225 illustrated in FIG. 7 may be used together in any combination. Moreover, it should be understood that embodiments of the at least one tooling block 104 are not limited to first tooling block 120, second tooling block 122, and third tooling block 124 illustrated in FIG. 3 and first tooling block 220, second tooling block 222, third tooling block 224, and fourth tooling block 225 illustrated in FIG. 7. Similarly, embodiments of base 102, at least one forcing member 150, and at least one biasing mechanism 160 are not limited to the embodiments illustrated herein. In addition, embodiments of plurality of structural components 20 with which mechanical pressure application system 100 can be used are not limited to the embodiments illustrated herein.

In certain embodiments, each component of mechanical pressure application system 100 is formed from materials configured to operably withstand an elevated temperature, such as, but not limited to, an elevated temperature associated with an adhesive curing or thermoplastic welding process. For example, each component of mechanical pressure application system 100 is formed from a metallic material. Mechanical pressure application system 100 is thus configured to reliably apply a desired pressure distribution to contact area 50 in an elevated temperature environment.

Figure 10:
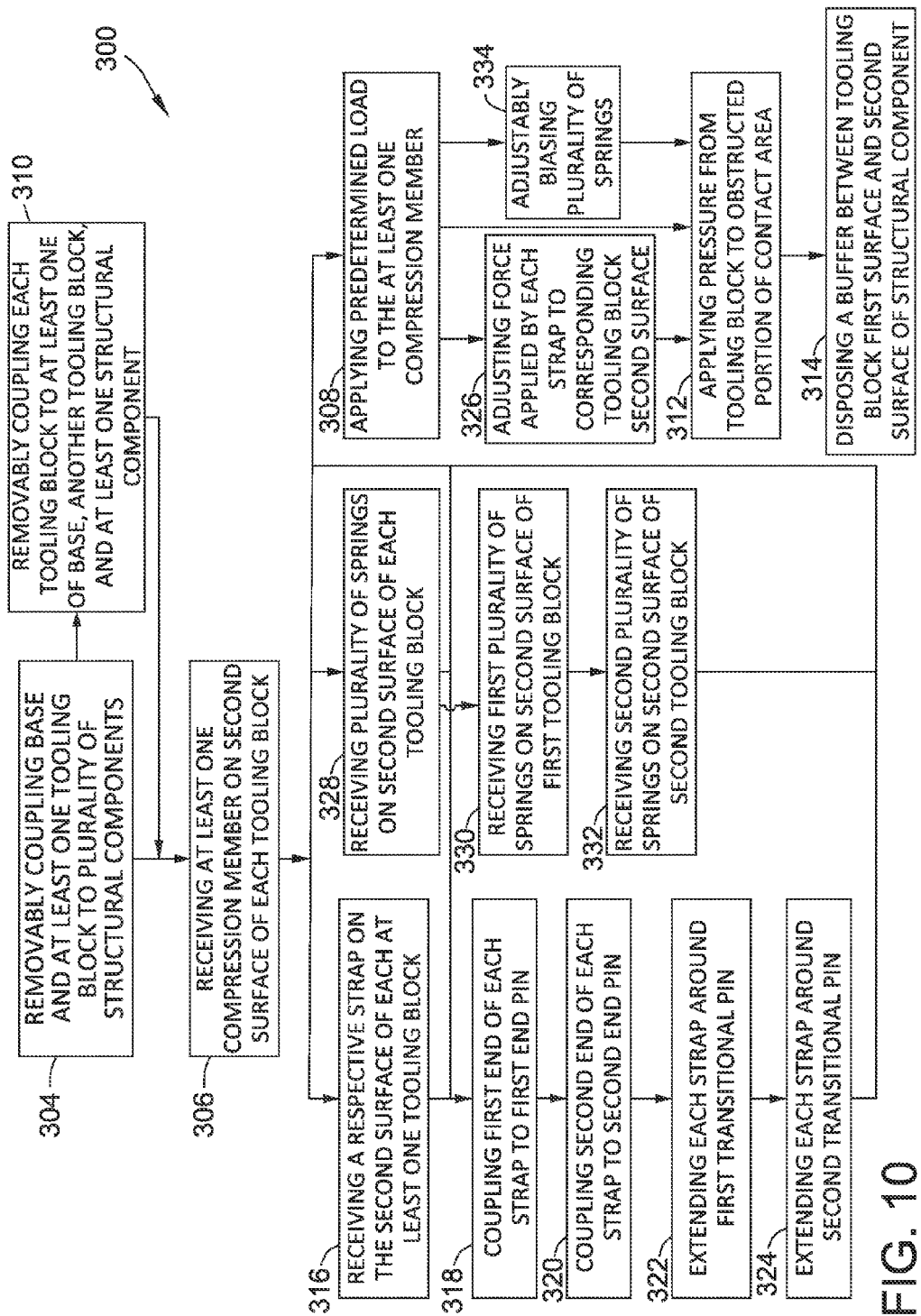
FIG. 10 is a flowchart of an embodiment of a method of bonding a plurality of structural components, such as the plurality of structural components shown in FIG. 2 and in FIG. 6.

FIG. 10 is a flowchart of an embodiment of a method 300 of applying a tailored pressure distribution to a plurality of structural components, such as plurality of structural components 20. Each of the plurality of structural components has a first surface and a second surface disposed generally opposite the first surface, and each first surface is configured to interface with the first surface of another of the plurality of structural components at a contact area, such as contact area 50. Method 300 includes removably coupling 304 a base, such as base 102, and at least one tooling block, such as at least one tooling block 104, to the plurality of structural components such that a first surface of each at least one tooling block, such as tooling block first surface 106, is positioned proximate the second surface of at least one of the plurality of structural components. Each at least one tooling block comprises a second surface, such as tooling block second surface 138, generally opposite the first surface. Method 300 further includes receiving 306 at least one forcing member, such as at least one forcing member 150, on the second surface of each at least one tooling block, and applying 308 a predetermined load to the at least one forcing member such that a force is transmitted from the at least one forcing member through the at least one tooling block to a corresponding portion of the contact area.

In certain embodiments, the step of removably coupling 304 the base and the at least one tooling block further comprises removably coupling 310 each at least one tooling block to at least one of the base, another at least one tooling block, and at least one of the plurality of structural components to facilitate maintaining the at least one tooling block in a desired position. Moreover, in certain embodiments, method 300 includes applying 312 pressure from the at least one tooling block to a portion of the contact area that is obstructed by one of the plurality of structural components. Method 300 may additionally include disposing 314 a buffer, such as buffer 130, between at least one tooling block first surface and the second surface of one of the plurality of structural components.

In certain embodiments, the step of receiving 306 the at least one forcing member further comprises receiving 316 a respective strap, such as strap 152, on the second surface of each at least one tooling block. Method 300 additionally may include coupling 318 a first end of each strap, such as first end 154, to a first end pin, such as first end pin 162. Method 300 further may include coupling 320 a second end of each strap, such as second end 156, to a second end pin, such as second end pin 168. Method 300 additionally may include extending 322 each strap at least partially around a first transitional pin, such as first transitional pin 164, and extending 324 each strap partially around a second transitional pin, such as second transitional pin 166, such that each strap substantially traverses the corresponding tooling block second surface. Moreover, the step of applying 308 the predetermined load to the at least one forcing member may include adjusting 326 a force applied by each strap to the corresponding tooling block second surface.

In certain embodiments, the step of receiving 306 the at least one forcing member further comprises receiving 328 a plurality of springs, such as first plurality of springs 252 and second plurality of springs 253, on the second surface of each at least one tooling block. The step of receiving 328 the plurality of springs may include receiving 330 a first plurality of springs, such as first plurality of springs 252, on the second surface of a first of the at least one tooling block, and receiving 332 a second plurality of springs, such as second plurality of springs 253, on the second surface of a second of the at least one tooling block. In some embodiments, a spring property of the first plurality of springs differs from the spring property of the second plurality of springs. In certain embodiments, the step of applying 308 the predetermined load to the at least one forcing member further includes adjustably biasing 334 the plurality of springs such that the plurality of springs applies a corresponding force to the second surface of the at least one tooling block.

Each of the processes of method 300 may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and a customer may be an airline, leasing company, military entity, service organization, and so on. Moreover, although an aerospace example is shown, the principles of the invention may be applied to other industries, such as the automotive industry.

The embodiments described herein provide a system and a method for an application of a tailored pressure distribution to a contact area between a plurality of structural components. The embodiments provide a mechanical pressure application system configured to apply sustained pressure to the contact area over a desired period of time. The embodiments are applicable to structural components having a wide range of geometries, including complex curvatures, angles, and orientations. In certain embodiments, the pressure applied to separate portions of the contact area is separately adjustable. The embodiments can be used in conjunction with structural components formed from metallic, composite, or any other suitable material in any combination. The embodiments can be used in conjunction with processes such as, but not limited to, adhesive bonding, film fusion joining and welding. Certain embodiments include tooling components that may be deployed within an elevated temperature environment for simultaneous application of pressure and heat.

The embodiments described herein provide improvements over at least some systems used to apply pressure to structural components. As compared to at least some known systems used to apply pressure, the mechanical pressure application system described herein provides a sustained pressure without need for air-tight bagging or electrical power, and thus facilitates less labor-intensive and time-consuming preparation. In addition, the embodiments provided herein enable tailored, uneven pressure distributions across portions of the contact area, which facilitates, for example, more finely tuned bonding of complex combinations of structural components, and/or simultaneous use of separate bonding materials and methods. The embodiments described herein also provide for the pressure to be applied while meeting heating requirements, without need for an autoclave.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mechanical pressure application system for applying a tailored pressure distribution to a plurality of structural components, wherein each of the plurality of structural components has a first surface and a second surface disposed generally opposite the first surface, each first surface is configured to interface with the first surface of another of the plurality of structural components at a contact area, said system comprising:
   a base, said base is complementary to the second surface of at least one of the plurality of structural components;
   at least one tooling block, wherein said base and said at least one tooling block are configured to removably couple to the plurality of structural components, each said at least one tooling block comprises a first surface and a generally opposite second surface, each said tooling block first surface is configured to be positioned proximate the second surface of at least one of the plurality of structural components when said base and said at least one tooling block are coupled to the plurality of structural components;
   at least one strap, wherein each said tooling block second surface is configured to receive said at least one strap; and
   at least one biasing mechanism configured to apply a predetermined load to said at least one strap, such that the contact area is pressed between said base and said first surface of said at least one tooling block.

2. The system according to claim 1, wherein each said at least one tooling block is configured to removably couple to at least one of said base, another said at least one tooling block, and at least one of the plurality of structural components to facilitate maintaining said tooling block in a desired position.

3. The system according to claim 1, wherein said at least one tooling block is configured to apply pressure to a portion of the contact area that is obstructed by one of the plurality of structural components.

4. The system according to claim 1, further comprising a buffer disposed between at least one said tooling block first surface and the second surface of one of the plurality of structural components.

5. A mechanical pressure application system for applying a tailored pressure distribution to a plurality of structural components, wherein each of the plurality of structural components has a first surface and a second surface disposed generally opposite the first surface, each first surface is configured to interface with the first surface of another of the plurality of structural components at a contact area, said system comprising:
   a base, said base is complementary to the second surface of at least one of the plurality of structural components;
   at least one tooling block, wherein said base and said at least one tooling block are configured to removably couple to the plurality of structural components, each said at least one tooling block comprises a first surface and a generally opposite second surface, each said tooling block first surface is configured to be positioned proximate the second surface of at least one of the plurality of structural components when said base and said at least one tooling block are coupled to the plurality of structural components;
   at least one forcing member, wherein each said tooling block second surface is configured to receive said at least one forcing member; and
   at least one biasing mechanism configured to apply a predetermined load to said at least one forcing member, such that a force is transmitted from said at least one forcing member through said tooling block to a corresponding portion of the contact area, wherein said at least one biasing mechanism comprises a first end pin, a first transitional pin, a second transitional pin, and a second end pin associated with each said at least one strap, and wherein each said strap is configured to couple at a first end to a corresponding said first end pin and at a second end to a corresponding said second end pin, each said strap is further configured to extend at least partially around a corresponding said first transitional pin, substantially traverse the corresponding said tooling block second surface, and extend partially around a corresponding said second transitional pin.

6. The system according to claim 5, wherein each said at least one tooling block is configured to removably couple to at least one of said base, another said at least one tooling block, and at least one of the plurality of structural components to facilitate maintaining said tooling block in a desired position.

7. The system according to claim 6, wherein said at least one biasing mechanism is adjustable to adjust a force applied by each said at least one forcing member to the corresponding said tooling block second surface.

8. A method of applying a tailored pressure distribution to a plurality of structural components, wherein each of the plurality of structural components has a first surface and a second surface disposed generally opposite the first surface, each first surface is configured to interface with the first surface of another of the plurality of structural components at a contact area, said method comprising:
   removably coupling a base and at least one tooling block to the plurality of structural components such that a first surface of each at least one tooling block is positioned proximate the second surface of at least one of the plurality of structural components, wherein the base is complementary to the second surface of at least one of the plurality of structural components, and wherein each at least one tooling block comprises a second surface generally opposite the first surface;
   receiving at least one strap on the second surface of each at least one tooling block; and
   applying a predetermined load to the at least one strap such that the contact area is pressed between the base and the first surface of the at least one tooling block.

9. The method according to claim 8, wherein said removably coupling the base and the at least one tooling block further comprises removably coupling each at least one tooling block to at least one of the base, another at least one tooling block, and at least one of the plurality of structural components to facilitate maintaining the at least one tooling block in a desired position.

10. The method according to claim 8, further comprising applying pressure from the at least one tooling block to a portion of the contact area that is obstructed by one of the plurality of structural components.

11. The method according to claim 8, further comprising disposing a buffer between at least one tooling block first surface and the second surface of one of the plurality of structural components.

12. A method of applying a tailored pressure distribution to a plurality of structural components, wherein each of the plurality of structural components has a first surface and a second surface disposed generally opposite the first surface, each first surface is configured to interface with the first surface of another of the plurality of structural components at a contact area, said method comprising:

removably coupling a base and at least one tooling block to the plurality of structural components such that a first surface of each at least one tooling block is positioned proximate the second surface of at least one of the plurality of structural components, wherein the base is complementary to the second surface of at least one of the plurality of structural components, and wherein each at least one tooling block comprises a second surface generally opposite the first surface;

receiving a respective strap on the second surface of each at least one tooling block;

coupling a first end of each strap to a first end pin;

coupling a second end of each strap to a second end pin;

extending each strap at least partially around a first transitional pin;

extending each strap partially around a second transitional pin, such that each strap substantially traverses the corresponding tooling block second surface; and applying a predetermined load to each strap such that a force is transmitted from the respective strap through the at least one tooling block to a corresponding portion of the contact area.

13. The method according to claim 12, wherein said removably coupling the base and the at least one tooling block further comprises removably coupling each at least one tooling block to at least one of the base, another at least one tooling block, and at least one of the plurality of structural components to facilitate maintaining the at least one tooling block in a desired position.

14. The method according to claim 12, wherein said applying the predetermined load to each strap further comprises adjusting a force applied by each strap to the corresponding tooling block second surface by adjusting a position of the second end pin relative to the first end pin.

* * * * *